(12) United States Patent
Link

(10) Patent No.: US 6,272,787 B1
(45) Date of Patent: Aug. 14, 2001

(54) PRINTED AND/OR FOIL SKIRT AND METHOD OF MANUFACTURE

(75) Inventor: Donald J. Link, Shakopee, MN (US)

(73) Assignee: Skirts Plus Corporation, Savage, MN (US)

( * ) Notice: Subject to any disclaimer, the term of this patent is extended or adjusted under 35 U.S.C. 154(b) by 0 days.

(21) Appl. No.: 09/262,667

(22) Filed: Mar. 4, 1999

Related U.S. Application Data

(63) Continuation-in-part of application No. 09/151,825, filed on Sep. 11, 1998.

(51) Int. Cl.$^7$ .............. A01K 85/00; B05D 5/00; B05D 3/02
(52) U.S. Cl. ............ 43/42.53; 427/256; 427/393.5; 43/42.24; 43/42.32; 43/42.28
(58) Field of Search ............... 43/42.53, 42.24, 43/42.3, 42.31, 42.29, 42.28, 42.32, 42.33, 42.37, 42.38; 427/256, 393.5; 264/73, 75, 76, 77

(56) References Cited

U.S. PATENT DOCUMENTS

| | | | |
|---|---|---|---|
| D. 339,185 | * 9/1993 | Link | D22/128 |
| 3,909,265 | * 9/1975 | Miyano et al. | 96/33 |
| 3,945,830 | * 3/1976 | Yazawa et al. | 96/75 |
| 3,953,212 | * 4/1976 | Miyano et al. | 96/75 |
| 3,959,060 | * 5/1976 | Jones | 156/245 |
| 4,108,955 | * 8/1978 | Thom | 264/222 |
| 4,335,495 | * 6/1982 | Buchanan | 29/428 |
| 4,445,432 | * 5/1984 | Ford, Jr. et al. | 101/152 |
| 4,640,041 | * 2/1987 | Stanley | 43/42.13 |
| 4,833,193 | * 5/1989 | Sieverding | 524/486 |
| 4,942,689 | * 7/1990 | Link et al. | 43/42.24 |
| 5,007,193 | 4/1991 | Goodley et al. | 43/42.28 |
| 5,045,360 | 9/1991 | Kosal et al. | 427/387 |
| 5,053,311 | * 10/1991 | Makino et al. | 430/166 |
| 5,226,268 | * 7/1993 | Sisson, Jr. | 43/42.13 |
| 5,251,395 | 10/1993 | Wicklund | 43/42.25 |
| 5,261,182 | * 11/1993 | Link | 43/42.36 |
| 5,426,886 | * 6/1995 | Stanley | 43/42.31 |
| 5,517,782 | * 5/1996 | Link et al. | 43/42.31 |
| 5,681,644 | * 10/1997 | Dressler | 428/195 |
| 5,709,047 | * 1/1998 | Link | 43/42.31 |
| 5,755,184 | * 5/1998 | Niedenberger | 119/707 |
| 5,822,913 | * 10/1998 | Lau | 43/42 |
| 5,899,015 | * 5/1999 | Link | 43/42.39 |
| 5,960,580 | * 10/1999 | Link | 43/42.53 |
| 6,032,400 | * 3/2000 | Lau | 43/42 |
| 6,037,042 | * 3/2000 | Kato et al. | 428/195 |
| 6,082,038 | * 7/2000 | Link | 43/42.24 |

* cited by examiner

Primary Examiner—Darren W. Ark
(74) Attorney, Agent, or Firm—Altera Law Group, LLC

(57) ABSTRACT

Multi-stranded silicone rubber fishing skirts printed with RTV adhesive inks and/or laminated with colored foils. The RTV inks set in the presence of humidity. The foils and inks can be applied to a silicone rubber substrate in preferred patterns and in registry with other areas containing foil or ink. The adhesive ink preferably comprises a mixture of an RTV adhesive, oil based thinner and/or pigment. In various processes the ink is silk-screen printed and air-dried. One or more foils can be bonded to the rubber with different techniques. The foil can be vulcanized to the rubber substrate, bonded to a wet ink, or bonded under pressure to exposed smooth surfaces. The surface texture can be defined during and after vulcanization at the mold and with a smoothing template or with printed ink.

7 Claims, 7 Drawing Sheets

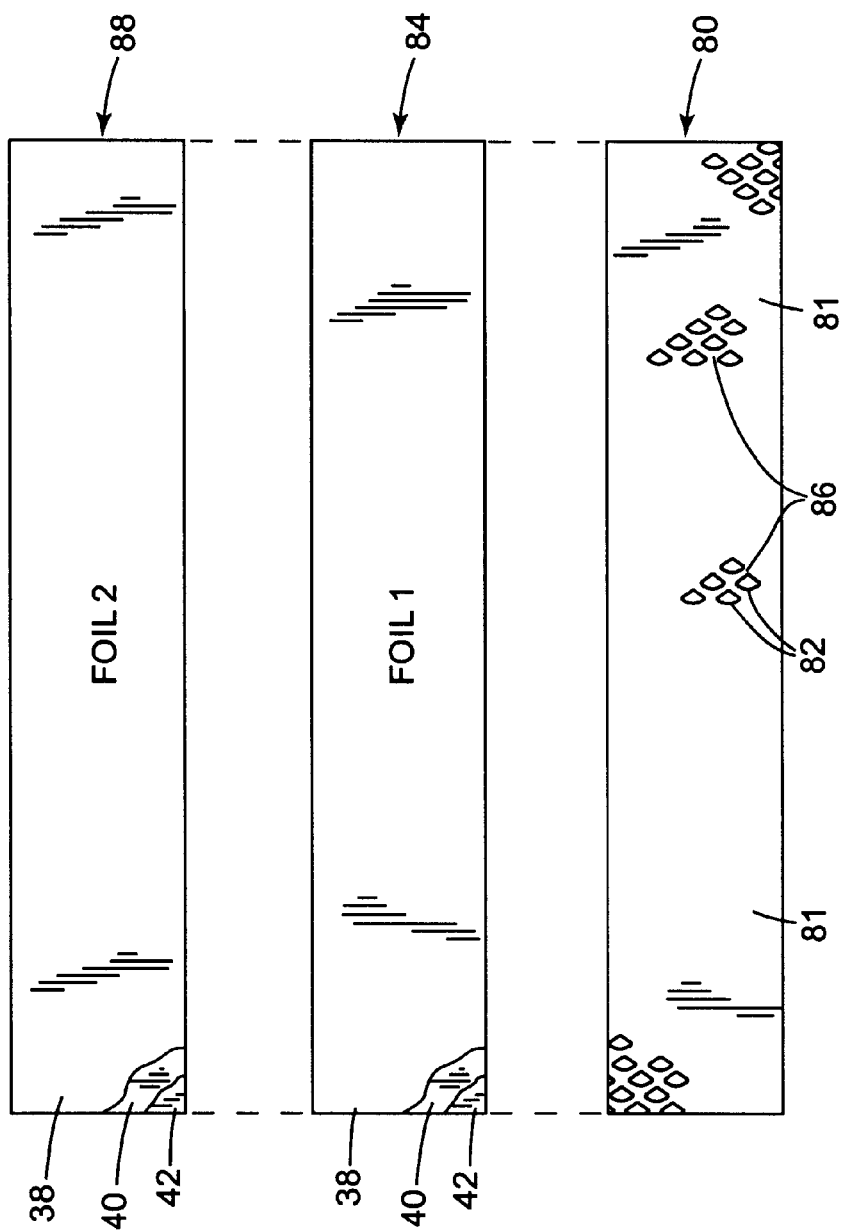

PRINTED AND/OR FOIL SKIRT AND METHOD OF MANUFACTURE

CROSS-REFERENCE TO RELATED APPLICATION

This application is a continuation-in-part of U.S. patent application Ser. No. 09/151,825 filed Sep. 11, 1998 pending.

BACKGROUND OF THE INVENTION

The present invention relates to fishing lures and, in particular, to a multi-stranded elastomer skirt having an RTV adhesive based ink mixture and/or metal foil applied to one or more surfaces of the skirt and the method of manufacture thereof.

A dressing commonly mounted to fishing lures, such as jigs, "spinner baits" or "buzz baits", is a multi-stranded skirt. The skirts are typically fabricated from sheets of an elastomer material, such as natural rubber or silicone rubber. The cured rubber sheets typically exhibit a relatively rough surface. Each sheet is processed into a number of regions that define individual skirts and each skirt is defined by a multiplicity of slits or strands that are attached to solid borders that bound the ends of the strands. The skirts are cut from the sheets with the borders attached and the strands are contained by the borders, until the strands are collected and bound together.

Rubber bands and elastomer collars are frequently used to secure the strands together. After banding, the borders are cut from the strands and the skirt is ready to be mounted to a desired lure. Banded skirts are principally sold to lure manufacturers. Examples of banded skirts can be found at U.S. Pat. Nos. 4,640,041 and 5,251,395.

Examples of "rollup" skirts or skirts with elastomer collars are shown at U.S. Pat. Nos. 5,517,782 and 5,709,047. Rollup skirts are formed by rolling and bonding the border of a skirt to a tubular, elastomer core piece with an appropriate adhesive. Once bonded, the border is cutaway and the cut ends of the strands trail from the core piece. The core piece and wrapped skirt stretch when the skirt is mounted to a lure.

Banded and rollup skirts are also commonly sold in the after-market to fisher persons as replacement components and to permit a fisher person to doctor his or her lures to a specific presentation, commensurate with fishing conditions. Skirts can tear or discolor from exposure to ultraviolet light, contaminants in the water or tackle box, and age. Natural and latex rubber are also susceptible to heat.

Most lures that use skirts include a molded lead head. Spinner baits and buzz baits also include a formed wire that protrudes from the head or body and support one or more metal blades that spin and vibrate as the lure is retrieved. A fishing line is attached to the wire or an eye of a hook that protrudes from the head or body. As the lures are retrieved, the strands of the skirt undulate with movement of the lure through water to entice a prey species of fish to strike.

One or more finished skirts are normally attached to a fishing lure at the rubber band or collar. The skirts can have the same or different colors and/or surface treatments. The skirt color is normally determined by colorants and metal flakes or glitter that are added to the rubber mixture during pre-forming.

Finished skirts exhibit a rainbow of colors and color combinations. Skirt appearance can be enhanced by printing patterns onto the rubber sheeting. Conventional inks, however, are not compatible with silicone rubber. The ink either doesn't adhere or does so only with difficulty. U.S. Pat. No. 5,251,395 discloses a thermal setting adhesive ink for silicone rubber fishing skirts. The ink is prepared from a conformal coating that is mixed with a pigment. The mixture is not thinned with a solvent and sets only in the presence of a thermal catalyst.

Skirt appearance may also be enhanced by bonding a metal foil to selected regions of the skirt. Foil covered skirts however are difficult to produce. Natural and latex rubber will accept conventional heat bonded foils, but the rubber degrades from heat and sunlight. Silicone rubber, otherwise, does not readily accept conventional foils, since the foil tends to peel and lift off.

The silicone rubber skirts of the present invention were developed to exhibit durable printed ink and metal foil finishes. Specially mixed adhesive inks that cure upon exposure to humidity and at room temperature were developed. The inks and foils are applied over continuous areas or in defined patterns. The printed ink and foil regions are also aligned or self-registered to separately printed, dyed, foiled and/or textured surfaces.

Alternative ink and foil bonding methods were developed to obtain the durable silicone rubber skirts. The methods selectively 1) print a solvent thinned, RTV adhesive based ink mixture that sets in the presence of humidity to a silicone rubber substrate, 2) vulcanize a foil to the substrate and/or 3) selectively define regions having relatively smooth and rough surface textures at the substrate. The adhesive ink can be printed by itself to the silicone rubber substrate to define a desired appearance. The adhesive ink can also be used to selectively bond commercially available foils to the substrate. The foil may also be vulcanized to the substrate or pressure bonded to surfaces having textures (e.g. 4–50 micro finish) demonstrating preferential adhesion characteristics to the foil. Varieties of ornamental surface treatments are obtained using the foregoing steps alone or in combination.

SUMMARY OF THE INVENTION

It is accordingly a primary object of the invention to provide an adhesive based printing ink mixture compatible with silicone rubber and foil laminates and simplified application processes and from which multi-colored ornamental surface treatments can be produced on silicone rubber sheets.

It is a further object of the invention to provide an adhesive ink mixture that is compatible with silicone rubber, that includes a room temperature vulcanization (RTV) epoxy adhesive, oil-based thinner, pigment, glitter and/or other additives, and that sets in the presence of a humidity catalyst.

It is a further object of the invention to provide silicone rubber substrates having foil regions that are bonded to regions printed with a RTV adhesive ink mixture.

It is a further object of the invention to provide fishing skirts having foils that are bonded to surfaces demonstrating preferential surface textures determined during the forming of the silicone rubber substrate or subsequent pressing or printing operations.

It is a further object of the invention to silk screen suitably colored RTV adhesive ink mixture(s) onto a silicone rubber substrate and/or bond a foil to the printed ink while wet or dried.

It is a further object of the invention to bond one or more foils to smooth surface regions determined by a printed ink or formed into the silicone rubber substrate.

Various of the foregoing objects, advantages and distinctions of the invention are obtained in a number of presently preferred silicone rubber skirts and processes used to fabricate the skirts. The skirts include printed RTV adhesive ink mixtures and/or vulcanized or laminated foils. The RTV adhesive inks are defined by mixtures of RTV adhesives, oil-based solvents and pigment.

The processes control substrate coloration, the placement of an RTV adhesive ink and/or surface texture to ornament selected regions of a silicone rubber substrate. In some processes, the solvent thinned RTV adhesive ink is silk screen printed onto the cured silicone rubber substrate. The concentration and granularity of pigment in the ink can be controlled to define surface textures compatible with foil bonding. In other processes, the curing of a silicone rubber pre-form is controlled relative to the bonding of a foil and/or a template is used to define smooth surface regions at the vulcanized sheet that support a foil bond. In still other processes, one or more foils are bonded at differing times in relation to the printing and slitting of the sheet.

Still other objects, advantages, distinctions and constructions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

BRIEF DESCRIPTION OF THE DRAWINGS

FIG. 7 is a plan view of a silicone rubber substrate having a first foil wet bonded and air dried to an RTV adhesive ink and a second foil bonded to intervening smooth surface regions.

DESCRIPTION OF THE PREFERRED EMBODIMENT

Figure 1:
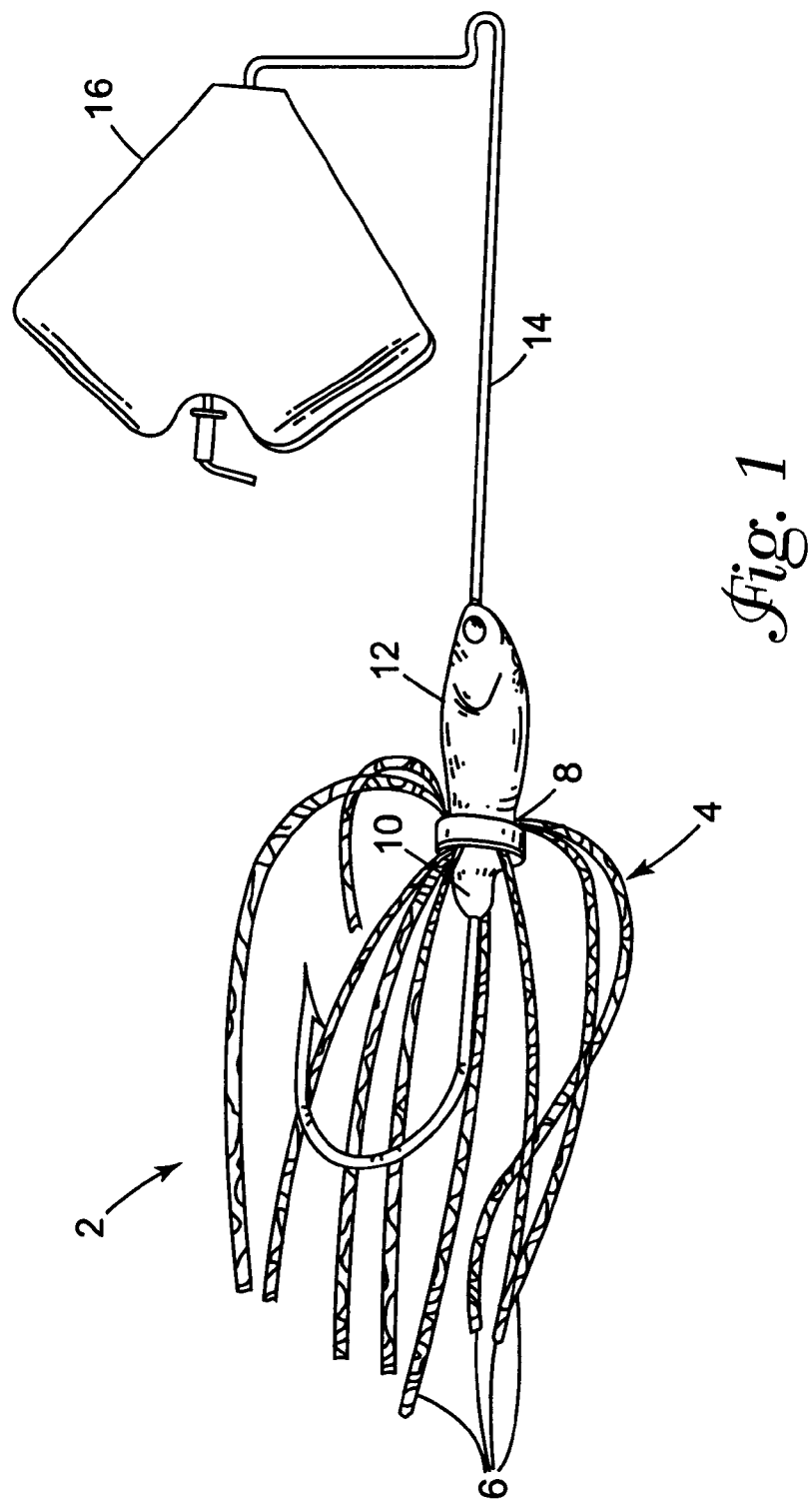
FIG. 1 is a plan drawing to a typical buzz bait fitted with a banded skirt.
Figure 2:
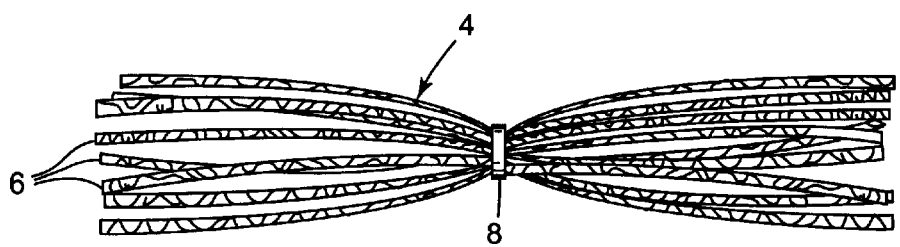
FIG. 2 is a plan view of a typical banded skirt.

Referring to FIG. 1, a typical buzz bait 2 is shown that is fitted with a skirt 4. A detailed drawing of the skirt 4 is shown in FIG. 2 as it appears when detached from the lure 2. The skirt 4 includes a number of strands 6 that are bound together with a band 8. The length and shape of the strands 6 can be varied. The number, coloration and/or surface ornamentation of the strands 6 can also be varied. The skirt 4 is preferably formed from an elastomer material, such as natural, latex or silicone rubber.

The band 8 is also typically formed from an elastomer material, although could be constructed from other materials, including plastics or polymers. Preferably, the band 8 is elastic so that it can expand and contract to secure the skirt 4 to the contours of an appendage 10 of the lure head or body 12. A formed wire 14 projects from the body 12 and supports a blade 16. The blade 16 is secured for rotation about the wire 14. With lure movement, the blade 16 rotates and flutters, along with the strands 6. The number and mounting of the blade 16 can be varied. It is appreciated that a spinner bait (not shown) is another example of a lure which utilizes a skirt connected to a lure head or body.

Figure 3:
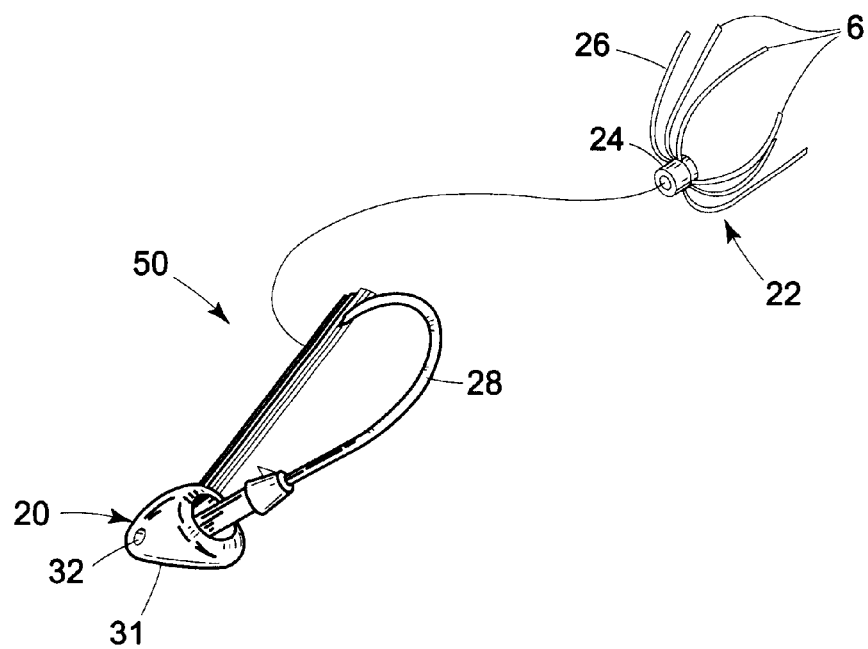
FIG. 3 is a perspective view shown in exploded assembly of a jig and to which a rollup skirt is attached.

FIG. 3 depicts in exploded assembly an alternative construction of a jig type lure 20 in relation to a rollup skirt 22. The rollup skirt 22 has an elastomer collar 24 and to which a multi-stranded skirt 26 is rolled and bonded. A hook 28 extends from a weighted head 31. A fishing line (not shown) attaches to an eye 32.

The lures 2 and 20 are typically purchased with skirts 4 and 22. The color and ornamentation of the skirts 4 and 22 are principally determined by pigments and glitter flecks bound in the natural, latex or silicone rubber from which the skirts are formed. Hot stamping foils, such as sold by sold by Crown Leaf Royal, Inc. and which include a MYLAR backing and coated adhesive, have also been bonded to rubber substrates. A thermally cured printing ink that has been used with silicone rubber skirts is described at U.S. Pat. No. 5,251,395.

In preference to thermally set adhesive inks, the skirts discussed below are printed with ink mixtures prepared from a room temperature vulcanization (RTV) adhesive. The RTV adhesive inks rely on humidity as the setting catalyst. They particularly set under nominal ambient conditions, such as normal ranges of room temperature and relative humidity. The setting time can vary with adhesive concentration, ambient temperature and relative humidity. The temperature and humidity conditions can be controlled with air conditioners, humidifiers and dehumidifiers.

Processes have also been developed to more efficiently bond commercial foils to silicone rubber. The foil can be bonded to the printed RTV adhesive ink or areas of the substrate having surface textures that promote bonding. The foil can also be bonded in registry with one or more previously printed inks or other bonded foils without having to specially align the foil.

According to one embodiment of the present invention, the adhesive inks are mixed from formulas that include substantial concentrations of an RTV adhesive. RTV adhesives desirably set at room temperature in the presence of humidity and do not require thermal curing. One acceptable RTV adhesive is a Series 118, general purpose, self-leveling silicone rubber sealant sold by General Electric. A variety of other commercially available RTV adhesives may also be used.

The RTV adhesive is preferably mixed with an oil-based thinner Kerosene, jet fuel, petroleum distillates, naphtha or other oil-based thinners are preferred. A concentration of pigment is added to the mixture as desired to define a preferred color. The concentration and granularity of the pigment can be varied to obtain a preferred color. The pigment concentration can also determine a surface texture at the substrate that promotes foil adhesion as described below.

In one embodiment of the present invention, nominal concentration ranges by weight of the principal mixture components used in the adhesive inks are 15 to 20 parts RTV; 8 to 12 parts thinner; and 8 to 20 parts pigment. Other components can be added to vary the qualities and properties of the adhesive ink.

The RTV adhesive ink can be printed in any of a variety of conventional processes. A silk screen printing process is preferred. The RTV adhesive inks do not require special curing conditions and set at room temperature. Humidity conditions act as the setting catalyst and can be adjusted to determine the setting time. The working time or "pot life" of the RTV adhesive ink is increased by printing the adhesive ink at a cool ambient temperature. A temperature in a range of 40 to 45 degrees Fahrenheit is ideal. The relative humidity of the printing environment should also be kept as low as possible to avoid premature setting of the RTV adhesive ink.

The RTV adhesive inks can also be used as an adhesive to bond a colored foil to a silicone rubber substrate. Depending where the adhesive is applied, the foil can be bonded to the entire surface of the substrate or only to patterned regions.

It has also been determined that the foil does not bond well to rough rubber or granular, inked surfaces. Foil adhesion can therefore be promoted by conditioning the substrate during or after curing with a smooth mold cavity or smoothing template. Surface textures having micro finish ratings in the range of 4 to 50 are preferred. The surface texture can also be tailored by printing the substrate with RTV adhesive inks containing controlled concentrations of pigment.

An appreciation of the surface preference of the foil enables numerous skirt fabrication processes, particularly processes where the foil is self-registered to the substrate. For example, with appropriate printing and surface texturing steps, one or more foils can be selectively bonded to previously printed ink regions or bare rubber surfaces without the need to specially align the foil to the substrate. Wide-ranging combinations of ink and foil surface ornamentation and color schemes are thereby possible at the silicone rubber skirts 4 and 22.

Foils can also be bonded to the silicone rubber substrate during the vulcanizing or curing of the rubber pre-form that defines the substrate.

Varieties of skirts 4 and 22 exhibiting printed ink and foil patterns have been constructed using the exemplary processes described below. The processes are particularly compatible with silicone rubber substrates to produce durable and aesthetically pleasing skirts 4 and 22.

Although the invention is directed to creating fishing lure skirts, the processes or selected steps can be applied to other products prepared from silicone rubber substrates. The processes or selected steps can also be judiciously used to ornament non-oily rubber substrates. The concentrations of the mixture components of the RTV adhesive ink and printing characteristics may have to be adjusted to be compatible with the different substrates and applications. For example, RTV adhesives are not compatible with natural and latex rubber, however, improved foil bonds can be obtained at natural and latex rubber skirts by creating preferential surface textures.

Figure 4:
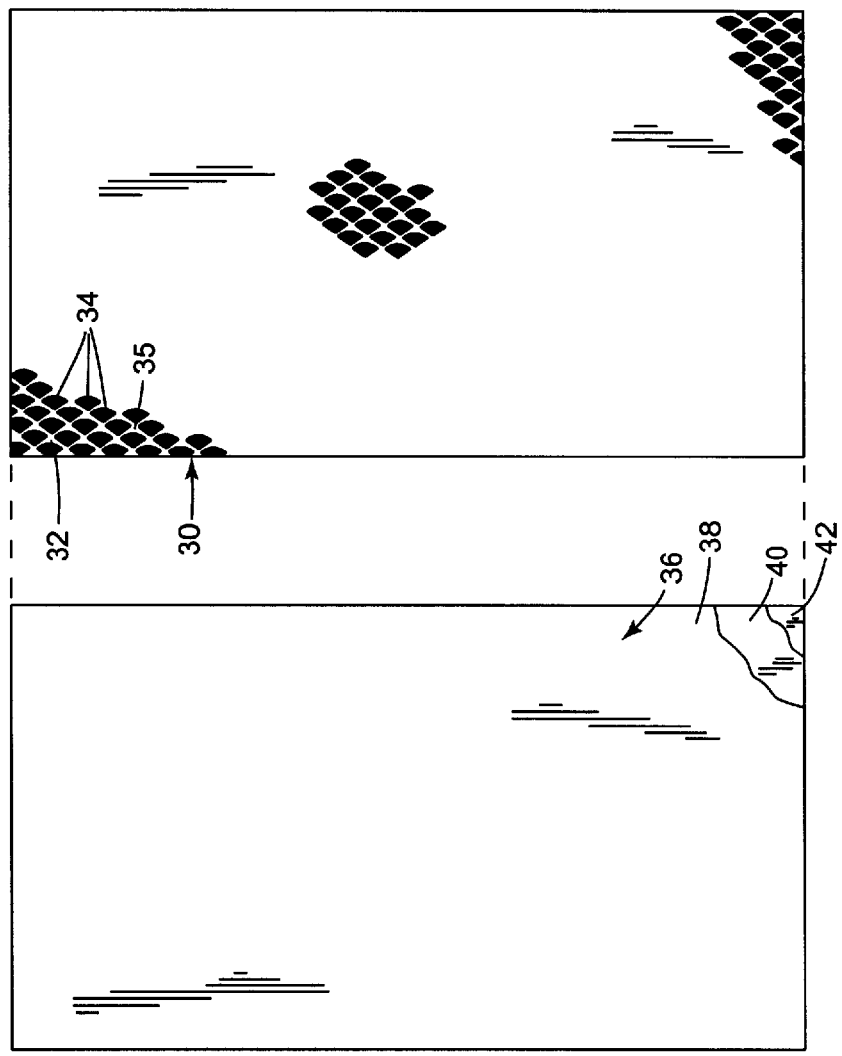
FIG. 4 is a cutaway assembly view of a silicone rubber substrate that has been pattern printed with an RTV ink.

FIG. 4 shows a rubber substrate 30 that has been silk screen printed with an RTV adhesive ink (e.g. 20 parts RTV adhesive; 8–20 parts pigment; 12 parts kerosene) to exhibit a fish scale pattern 32. Individual scales 34 have a shell-like appearance. The color of the scales 34 will depend upon the pigment color added to the RTV mixture. The color of the adjoining spaces 35 between the scales 34 will depend upon the dye color of the rubber substrate 30, which may include flakes of glitter. The spaces 35 may also be printed with another RTV adhesive ink or covered with foil as described below. The foregoing RTV adhesive ink mixture normally sets over four to eight hours at nominal ambient conditions, for example, a room temperature in the range of 65 to 100 degrees Fahrenheit and a relative humidity of 50 to 95%.

The various printings of RTV adhesive ink are performed over the substrate 30 in conventional fashion. The inks can be applied using a variety of processes to either or both the top and bottom surfaces of the substrate 30. Silk-screen printing is presently preferred. An exemplary manufacturing process for printing an RTV adhesive ink on a rubber substrate is described below in Process 1.

Figure 5:
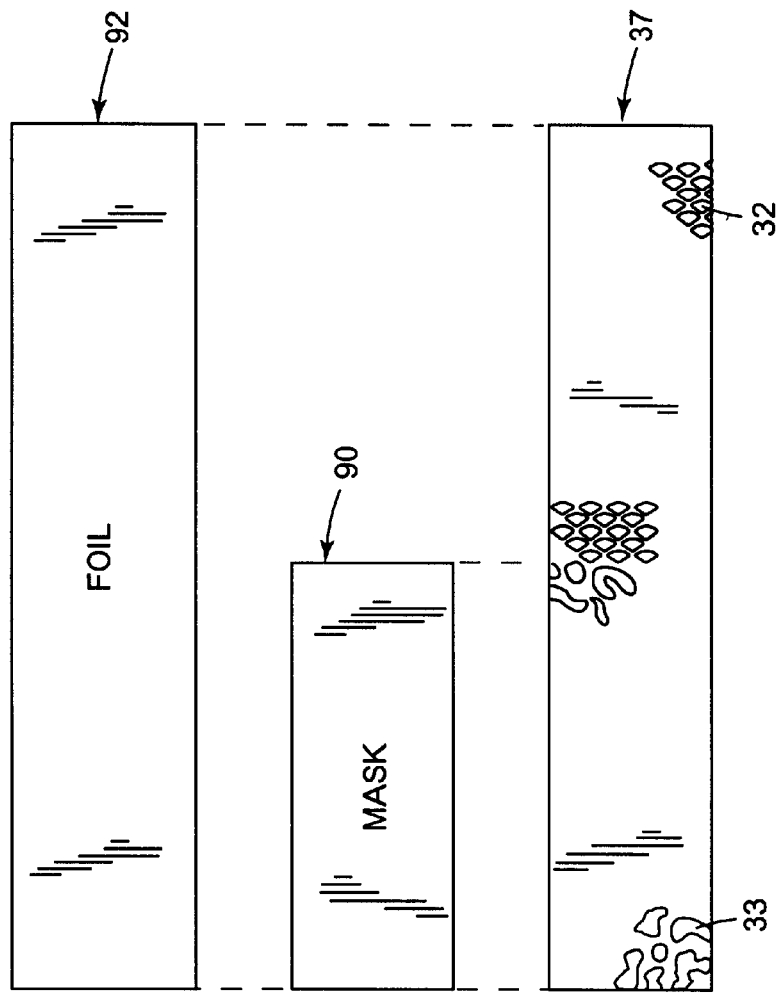
FIG. 5 is a plan view of a rubber substrate that has been pattern printed with camouflage and fish scale patterns at opposite ends and that can be can be partially masked during the bonding a foil treatment.

The substrate 30 can be printed with any desired pattern. For example, FIG. 5 shows a substrate 37 having adjoining halves printed with a fish scale pattern 32 and a camouflage pattern 33. A skirt 4 or 22 cut from the substrate 37 when attached to a lure 2 or 50 will demonstrate different appearances at a center grouping of the strands 6 versus a concentric outer grouping of strands 6.

The appearance of finished skirts 4 and 22 can be enhanced by bonding one or more commercially available hot stamping foils to the substrate 30. Exemplary manufacturing processes and pertinent printing and foiling steps are described below at Processes 2 to 9. Processes 2 and 3 describe methods for bonding the foil to the silicone rubber as the rubber is vulcanized. The foil can be applied to cover the entire surface of the substrate or the foil can be pre-patterned such that when bonded to the vulcanized sheet a patterned surface ornamentation is obtained.

More typically and with attention to FIG. 4 and Process 6 or Process 8, a foil sheet 36 having a MYLAR backing 38, a colored foil 40 and adhesive-coating 42 can be bonded to the printed scales 34, while wet. The foil 40 becomes fixed to the scales 34 after the RTV adhesive ink dries. The backing 38 is then removed and only the scales are covered with foil. The color at the spaces 35 is determined by the substrate color. The color of the spaces 35 can be changed in a separate printing or foiling step. Alternatively, the scales 34 can be printed with a granular adhesive ink. Once dried, a foil can be bonded to the spaces 35, if the spaces 35 exhibit a sufficiently smooth surface texture. A foil may also be bonded to the dried scales 34, if the dried scales 34 have a smooth surface texture, reference Process 7. With the judicious preparation of the substrate 30. different color foils can therefore be bonded to either or both of the scales 34 and spaces 35, whether the regions are defined by RTV ink or differences in surface texture.

The relative smoothness of the patterned regions 32 and 33 or possibly still other regions on the substrates 30 and 37 can be defined during the forming of the substrates. For example, the surface texture of the substrate can be defined by casting the pre-form in a mold cavity having rough and/or smooth interior surfaces. A rough surface finish at a sand-blasted mold measured in micro inches on a micro finish scale can exhibit a 250 to 500 micro finish. A cured or partially cured rubber substrate can also be stamped with a texturing die or template. For example, a MYLAR template, that may or may not include patterned cutouts, can be pressed to the substrate during or after curing to define smooth surface regions, reference processes 4, 6 and 9. A smooth region compatible with foil bonding can exhibit a 4 to 50 micro finish.

Surface texture can also be defined by controlling characteristics of any applied ink. As discussed above, the foil 40 will adhere to the wet RTV ink. The foil 40 can also be made to adhere to the smoother of any available dried ink surfaces. For example, the texture of the scales 34 can be tailored by controlling the quantity and/or granularity of pigment in the RTV ink. The foil can be bonded to scales 34 printed with an RTV ink having a pigment concentration of 8 to 10 parts. Masks may also be used during the bonding of foils to dried inks to assure bonding to specific printed regions of the substrate.

Figure 6:
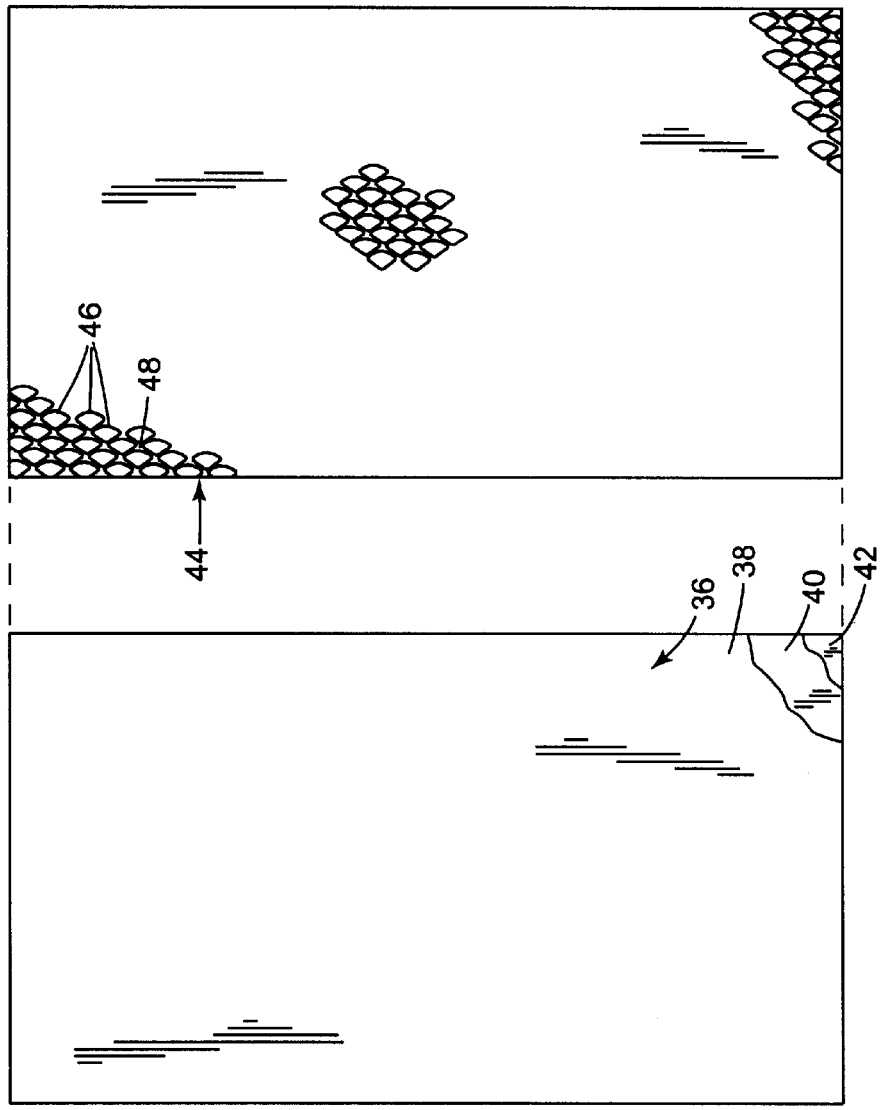
FIG. 6 is a cutaway assembly view of a silicone rubber substrate having surface regions that are formed with differing relative textures and to the smoother regions of which a foil is bonded.

Stated differently and with additional attention to FIG. 6, if the surface of a substrate 44 includes dried fish scales 46 that are relatively smoother than adjoining rough spaces 48, the foil 40 can be made to bond to the smoother fish scales 46. Bonding can be effected by setting the foil 40 over the printed substrate 44, covering the foil 40 with a platen and applying pressure to the platen.

Foil bonding to a smooth surface defined by dried ink can also be effected during a die-cutting or slitting step. In this instance, the foil 36 is placed over the printed substrate 30 and the slitting die applies pressure. The pressure causes the adhesive 42 to bond to the smoother of the two regions 46 or 48 as the strands 6 are cut, reference Processes 4 and 9.

FIG. 7 shows yet another silicone rubber substrate 80 having a glossy smooth surface 81. Fish scales 82 are printed with a wet RTV ink. A first foil 84 is bonded to the scales 82. After air drying and removal of the backing and residue of the first foil 84, a second foil 88 is separately bonded to the exposed smooth spaces 86. The second foil 88 can be set with a separate pressing operation or during die cutting. The opposite surface of the substrate 80 can exhibit the color of the substrate or can be separately printed or covered with a foil.

It is to be appreciated still other processes and schemes to ornament skirts are possible by masking off and separately processing selected regions of a substrate. For example and returning attention to FIG. 5, the regions containing patterns 32 and 33 can be separately covered with a mask 90 and printed and/or laminated with one or more foils 92.

EXAMPLES

The following examples are presented to further illustrate the ingredients, compositions, and methods of the invention, but are not to be construed as limiting the invention. The various processes have been used to produce fishing lure skirts having printed and/or foil covered surfaces. All parts and percentages are on a weight basis, unless indicated to the contrary.

Process 1

1. Silk screen fish scale or other pattern of RTV adhesive ink mixture (e.g. 20 parts RTV; 8–10 parts pigment; 12 parts kerosene) is applied onto cured silicone rubber sheet at temperature in a range of 40 to 50 degrees Fahrenheit and low relative humidity.

2. Cure ink at room temperature until dry.

3. Mounting slitting die to press and die cut rubber sheet.

4. No post cure.

Process 2

1. Mount extruded, uncured silicone rubber pre-form to mold cavity. The uncured pre-form typically has a nominal thickness of 0.060 inches.

2. Position foil (solid or patterned) on pre-form. Press foil (i.e. vulcanize) for appropriate times at selected temperature and pressure until the rubber vulcanizes and the foil bonds to the rubber. For example, a time in the range of 180 to 360 seconds, at a temperature in the range of 315 to 330 degrees Fahrenheit and a pressure in the range of 1700 to 2000 psi.

3. Mount slitting die to press and die cut vulcanized rubber sheet and foil.

4. Remove backing from foiled strands.

5. No post cure.

Process 3

1. Mount uncured silicone rubber pre-form to mold cavity.

2. Heat press to press temperature and partially cure pre-form for approximately 60 seconds.

3. Position foil to partially cured pre-form and press for 200 to 300 seconds until curing and bonding are complete.

4. Remove backing from foil.

5. Mount slitting die to press and die cut vulcanized silicone rubber and foil.

6. No post cure.

Process 4

1. Mount uncured silicone rubber pre-form to mold cavity. A typical rough surface texture of the mold cavity can have a 250–500 micro finish.

2. Mount smoothing template (e.g. a MYLAR sheet having a 4–50 micro finish, cut to a preferred shape and that contains apertures) to mold cavity and over pre-form.

3. Press for predetermined time, temperature and pressure (e.g. 180 to 360 seconds, at a temperature in the range of 315 to 330 degrees Fahrenheit and a pressure in the range of 1700 to 2000 psi.) to vulcanize silicone rubber and define surface regions having surface textures defined by the template and mold cavity. Patterned, smooth surface regions will be particularly defined where the template contacts the rubber.

4. Remove template from vulcanized rubber sheet.

5. Position foil to cured rubber sheet at die cutter.

6. Die cut rubber and foil sheets, foil bonds to smooth surface regions of rubber sheet.

7. Remove backing from foiled strands.

8. Post cure slit sheets@125–150 degrees Fahrenheit for approximately 20 to 30 minutes to final set foil.

Process 5

1. Mount cured silicone rubber sheet having smooth surface finish to press platen.

2. Position foil on sheet.

3. Heat press platen to a temperature in the range of 125 to 180 degrees Fahrenheit.

4. Mount slitting die to press and die cut pre-heated rubber and foil sheets. Foil bonds to exposed smooth surface of rubber sheet.

5. Remove backing from foiled strands.

6. Post cure slit skirts@125–150 degrees Fahrenheit for approximately 20 to 30 minutes to final set foil.

Process 6

1. Mount extruded, uncured silicone rubber pre-form to mold cavity.

2. Mount smoothing template (e.g. 4–50 micro finish) to mold cavity.

3. Press for predetermined time, temperature and pressure (e.g. 180 to 360 seconds, at a temperature in the range of 315 to 330 degrees Fahrenheit and a pressure in the range of 1700 to 2000 psi.) to cure rubber and define smooth surface.

4. Print smooth surface with RTV ink having pigment concentration of 815 parts to create patterned ink regions on rubber sheet.

5. Position foil on rubber sheet.

6. Roll or press foil to wet ink to remove air.

7. Air cure ink to foil at room temperature and controlled humidity (e.g. 65–100 degrees Fahrenheit and 50 to 95% humidity) for 4 to 8 hours.

8. Mount slitting die to press and die cut sheet.

9. Remove backing from foiled strands.

10. No post cure.

Process 7

1. Silk screen fish scale or other pattern of RTV adhesive ink mixture (e.g. 20 parts RTV; 8–10 parts pigment; 12 parts kerosene) onto cured silicone rubber sheet at temperature in a range of 40 to 45 degrees Fahrenheit and low relative humidity.

2. Cure ink at room temperature and controlled humidity until dry and ink defines smooth preferential bonding surfaces relative to silicone rubber.

3. Position foil to printed silicone rubber sheet.

4. Mount slitting die to press and die cut rubber sheet, foil bonds to smooth printed surface regions.

5. Remove backing from foiled strands.

6. Post cure slit sheet@125–150 degrees Fahrenheit for approximately 20 to 30 minutes to final set foil.

Process 8

1. Prepare vulcanized silicone rubber sheet with surface texture defined by mold cavity.

2. Print RTV ink onto silicone rubber sheet in low relative humidity environment at temperature in a range of 40 to 45 degrees Fahrenheit.

3. Position foil over ink.

4. Roll or press foil to wet ink to remove air.

5. Air cure ink to foil at room temperature and controlled humidity for 4 to 8 hours.

6. Mount foiled sheet and slitting die to press and die cut foil covered sheet.

7. Remove backing from foiled strands. (Backing may be removed prior to slitting.)

8. No post cure.

Process 9

1. Mount extruded, uncured silicone rubber pre-form to mold cavity.

2. Mount patterned smoothing template (e.g. 4–50 micro finish) to mold cavity.

3. Press for predetermined time, temperature and pressure to cure silicone rubber and define surface regions of desired texture relative to template and mold cavity.

4. Print the vulcanized silicone rubber sheet with an RTV adhesive ink having a pigment concentration of 8 to 10 parts in a low relative humidity environment at a temperature in a range of 40 to 45 degrees Fahrenheit.

5. Position #1 foil over wet ink at printed silicone rubber sheet.

6. Roll or press foil #1 to wet ink to remove air.

7. Air cure foil #1 to ink at room temperature and controlled humidity for 4 to 8 hours and remove backing and residue of foil #1.

8. Mount foil #2 over sheet containing foil #1 and press foil #2 with smooth platen to bond foil #2 to exposed smooth surfaces at silicone rubber sheet. Alternatively, mount slitting die to press and die cut sheet, foil #2 bonds to exposed smooth silicone rubber surfaces.

9. Remove backing from foiled strands.

10. Post cure slit sheets@125–150 degrees Fahrenheit for approximately 20 to 30 minutes to final set foil #2.

Another alternative embodiment consistent with the invention is described below. In this embodiment, glitter is added to the ink mixture before the printing process. For example, in one embodiment, approximately four grams of 0.004 glitter are added to the base ink mixture (e.g. 20 parts RTV adhesive, 12 parts kerosene and 4 parts glitter) before the printing process. The glitter is mixed together with the ink mixture and the ink mixture is then applied to the silicon rubber sheets as previously described. The glitter may take numerous forms, sizes and colors and still be used in the process. One preferred size and type of glitter is Polyester Ultra Thin 0.0005 by 0.004 by 0.004 which is manufactured by Meadowbrook Inventions, Inc. in Bernardsville, N.J. It is appreciated that numerous other types of glitter may be utilized with the ink mixture and applied to the silicon rubber sheet to produce fishing lure skirts having printed surfaces which contain glitter.

It is further appreciated that the addition of glitter to the adhesive ink mixture for application to the silicon rubber sheet provides for manufacture of a fishing lure skirt having an ink pattern containing glitter which adds to the visual appearance of the fishing lure skirt. Further, the addition of glitter to the ink mixture also provides for a textured feel on the outer surfaces of the silicon rubber after curing of the ink. A fishing lure skirt on which the RTV adhesive ink mixture containing glitter has been applied has a roughened texture and feel on the surfaces of the skirt similar to the touch of the scales of a fish. Accordingly, in one application, the RTV adhesive ink mixture containing glitter is applied in a fish scale pattern to the silicon rubber sheet. The resulting fishing lure skirt then includes a visual fish scale pattern further having a texture and feel similar to that of fish scales. A further advantage is that the texture on the surface of a fishing lure skirt which includes the RTV adhesive ink mixture and glitter is such that it will prevent strands of the fishing lure skirt from sticking together after the silicon rubber sheet is cut into strands.

The following example is presented to further illustrate the ingredients, compositions, and methods of one alternative embodiment of the invention, but is not to be construed as limiting the invention.

Process 10

1. Silk screen fish scale or other pattern of RTV adhesive ink mixture (e.g. 15 to 20 parts RTV adhesive; 8 to 12 parts kerosene; 4 to 6 parts glitter) onto cured silicon rubber sheet at temperature in a range of about 40 to 50 degrees Fahrenheit and low relative humidity.

2. Cure ink at room temperature until dry.

3. Mounting slitting die to press and die cut rubber sheet.

4. No post cure.

While the invention has been described with respect to a preferred construction and considered improvements or alternatives thereto, still other constructions may be suggested to those skilled in the art. The foregoing description should therefore be construed to include all those embodiments within the spirit and scope of the following claims.

What is claimed is:

1. A fishing skirt, comprising;

a) a silicone rubber substrate including a plurality of strands; and b) wherein the plurality of strands include exposed surfaces which are printed with an oil based solvent ink mixture including glitter and a room temperature vulcanization (RTV) adhesive, whereby the ink cures in a room temperature environment to define a durable ornamental finish.

2. A fishing skirts as set forth in claim 1 wherein the ink mixture is applied to the substrate to define a pre-determined pattern and wherein the glitter contained in the ink mixture provides for a textured surface on the plurality of strands of the silicon rubber substrate.

3. A method for constructing a multi-stranded fishing skirt comprising:
   a) printing a room temperature vulcanization (RTV) adhesive ink mixture including a RTV adhesive and an oil-based solvent, onto a silicon rubber sheet;
   b) curing the ink to the silicon rubber sheet at room temperature until dry;
   c) cutting the ink coated rubber sheet into multiple strands; and
   d) binding the strands.

4. A method as set forth in claim 3 wherein the ink mixture is 15 to 20 parts RTV adhesive and 8 to 12 parts oil-based solvent.

5. A method as set forth in claim 4 wherein the ink mixture further includes 4 to 6 parts glitter.

6. A method as set forth in claim 3 wherein the ink mixture includes glitter.

7. A method for constructing a multi-stranded fishing skirt comprising:
   a) printing a room temperature vulcanization (RTV) adhesive ink mixture including a RTV adhesive and an oil-based solvent, onto a silicon rubber sheet;
   b) mounting a foil over the wet ink mixture;
   c) curing the ink and foil to the silicon rubber sheet at room temperature until dry;
   d) cutting the ink coated rubber sheet into multiple strands; and
   e) binding the strands.

* * * * *